US010488600B2

(12) United States Patent
Lock et al.

(10) Patent No.: US 10,488,600 B2
(45) Date of Patent: Nov. 26, 2019

(54) METHODS OF SECURING AN OPTICAL FIBER WITHIN AN OPTICAL FIBER CONNECTOR USING A HEATING APPARATUS

(71) Applicant: Corning Optical Communications LLC, Hickory, NC (US)

(72) Inventors: William Edward Lock, Horseheads, NY (US); Phillip R. MacCormack, Rochester, NY (US); Cameron John Tovey, Painted Post, NY (US); Todd Marshall Wetherill, Painted Post, NY (US)

(73) Assignee: Corning Optical Communications LLC, Charlotte, NC (US)

( * ) Notice: Subject to any disclaimer, the term of this patent is extended or adjusted under 35 U.S.C. 154(b) by 411 days.

(21) Appl. No.: 15/285,948

(22) Filed: Oct. 5, 2016

(65) Prior Publication Data

US 2018/0059335 A1 Mar. 1, 2018

Related U.S. Application Data (60) Provisional application No. 62/394,328, filed on Sep. 14, 2016, provisional application No. 62/378,434, filed on Aug. 23, 2016.

(51) Int. Cl.
*G02B 6/38* (2006.01)
*B29D 11/00* (2006.01)

(52) U.S. Cl.
CPC ...... *G02B 6/3861* (2013.01); *B29D 11/00721* (2013.01); *B29K 2995/0018* (2013.01)

(58) Field of Classification Search
CPC ............ G02B 6/3861; B29D 11/00721; B29K 2995/0018
See application file for complete search history.

(56) References Cited

U.S. PATENT DOCUMENTS

| | | | |
|---|---|---|---|
| 6,491,444 B1 | 12/2002 | Greub et al. | |
| 6,895,654 B2 | 5/2005 | Strandberg et al. | |
| 8,702,322 B1 | 4/2014 | Danley et al. | |
| 2008/0277810 A1* | 11/2008 | Sato ................. | B29D 11/00721 264/1.29 |
| 2014/0199027 A1 | 7/2014 | Miller | |
| 2015/0098679 A1 | 4/2015 | Fewkes et al. | |
| 2015/0219860 A1 | 8/2015 | Danley et al. | |

(Continued)

FOREIGN PATENT DOCUMENTS

TW   I317316 B   12/2005

OTHER PUBLICATIONS

International Search Report and Written Opinion PCT/US2017/047557 dated Oct. 23, 2017.

*Primary Examiner* — Christopher T Schatz
(74) *Attorney, Agent, or Firm* — Kapil U. Banakar (57) ABSTRACT

Methods of securing an optical fiber within an optical fiber connector include applying heat to a front-end section of a ferrule through a heating sleeve. The heating sleeve at least partially surrounds the front-end section of the ferrule and heats a bonding agent that resides within the ferrule a securing temperature. The optical fiber is inserted into the optical fiber connector and through the bonding agent. The optical fiber is secured in the ferrule axial bore by the bonding agent when the bonding agent reaches the securing temperature.

15 Claims, 8 Drawing Sheets

(56) References Cited

U.S. PATENT DOCUMENTS

| | | |
|---|---|---|
| 2015/0219861 A1 | 8/2015 | Danley et al. |
| 2015/0301292 A1 | 10/2015 | Danley et al. |
| 2015/0316728 A1 | 11/2015 | Kobyakov et al. |
| 2015/0346452 A1 | 12/2015 | Chien et al. |

* cited by examiner

METHODS OF SECURING AN OPTICAL FIBER WITHIN AN OPTICAL FIBER CONNECTOR USING A HEATING APPARATUS

PRIORITY APPLICATIONS

This application claims the benefit of priority under 35 U.S.C. § 119 of U.S. Provisional Application 62/394,328, filed on Sep. 14, 2016, and U.S. Provisional Application 62/378,434, filed on Aug. 23, 2016, the contents of both applications being relied upon and incorporated herein by reference in their entireties.

FIELD

The present disclosure relates to optical fiber connectors and in particular to methods of securing an optical fiber within an optical fiber connector using a heating apparatus.

BACKGROUND

Benefits of optical fibers include extremely wide bandwidth and low noise operation. In cases where high bandwidth is required between two interconnection locations, fiber optic cables having fiber optic connectors can be used to communicate information between these locations. The fiber optic connectors can be used to conveniently connect and disconnect the fiber optic cables from the interconnection locations when maintenance and upgrades occur.

Each of the fiber optic connectors can include a ferrule assembly having a ferrule and an optical fiber. The ferrule has several purposes. The ferrule includes an internal pathway, called a ferrule bore, through which the optical fiber is supported and protected. The ferrule bore also includes an opening at an end face of the ferrule. The opening is where an optical surface of an end portion of the optical fiber may be precisely located to help ensure efficient optical coupling with the optical fiber of a complementary connector. In this regard, the end portion of the optical fiber needs to be precisely secured to the ferrule to prevent movement within the ferrule bore that may otherwise result in an uncertain position between the optical surface of the optical fiber and the optical fiber of the complementary connector. If a gap or a misalignment occurs between the optical fibers in a mated pair of connectors, signal loss, otherwise known as attenuation, may occur.

A bonding agent, for example an epoxy resin, is one approach to secure the optical fiber to the ferrule, but there are manufacturing challenges with this approach. Specifically, the ferrule is often first assembled with a fiber optic connector housing. The optical fiber and an uncured bonding agent are later inserted within the ferrule bore. The optical fiber may then be secured to the ferrule by curing the bonding agent. Curing is a chemical process specific for different types of bonding agents and may involve the bonding agent forming cross-linked thermoset structures, thus enabling secure bonds to be created between proximate objects. For many bonding agents compatible to secure the optical fiber to the ferrule, heat is required to bring the temperature of the bonding agent to a securing temperature to facilitate the bonding required of the bonding agent during curing. If the temperature does not reach this value, then a reduced percentage of bonding may occur, and the optical fiber may be inadequately secured to the ferrule.

To provide the heat to elevate the temperature, the optical fiber and ferrule are typically heated in an oven relatively slowly, for example approximately 20 minutes, to elevate the temperature of the bonding agent without damaging the fiber optic housing, which may be damaged by applying more intense heat to speed curing. The relatively slow heating process to protect the housing imposes a significant restriction on manufacturing efficiency.

Other heating devices, such as lasers, have been used to heat ferrules, and thereby cure the bonding agent disposed therein, so that faster curing can occur. However, for ferrules mostly enclosed within fiber optic connector housings, lasers are used only to directly heat a tip of the ferrule to avoid damaging the fiber optic connector housing. It can be a challenge to obtain sufficient adhesion/bonding while avoiding intense localized heating of the bonding agent with such approaches.

SUMMARY

An embodiment of the disclosure is a method of securing an optical fiber within an optical fiber connector having a connector housing with an open front end and a ferrule with an outer surface, a front-end section, and an axial bore that contains a bonding agent. The method includes: a) applying heat to the front-end section of the ferrule through a heating sleeve that at least partially surrounds the front-end section of the ferrule to heat the bonding agent to a securing temperature; b) inserting the optical fiber into the optical fiber connector so that a front-end section of the optical fiber resides within the axial bore of the ferrule; and wherein the optical fiber is secured in the axial bore of the ferrule by the bonding agent when the bonding agent reaches the securing temperature.

Another embodiment of the disclosure is the method described above, wherein the heating sleeve is made of a first material and includes an inner surface and further comprises a coating of a second material on the inner surface, wherein the second material has a hardness greater than the first material.

Another embodiment of the disclosure is a method of securing an optical fiber within an optical fiber connector having a connector housing with an open front end and a ferrule with an outer surface, an axial bore, and a front-end section. The method includes: a) positioning a heating sleeve so that the front-end section of the ferrule resides within an interior of the heating sleeve; b) conducting heat from the heating sleeve to the ferrule and to a bonding agent in the axial bore of the ferrule to bring the bonding agent to a securing temperature while the insulating sleeve inhibits the conduction of heat from the heating sleeve to the connector housing; c) inserting the optical fiber into the optical fiber connector so that a front-end section of the optical fiber resides within the axial bore of the ferrule; and wherein the optical fiber is secured in the axial bore of the ferrule by the bonding agent when the bonding agent reaches the securing temperature.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Figure 1:
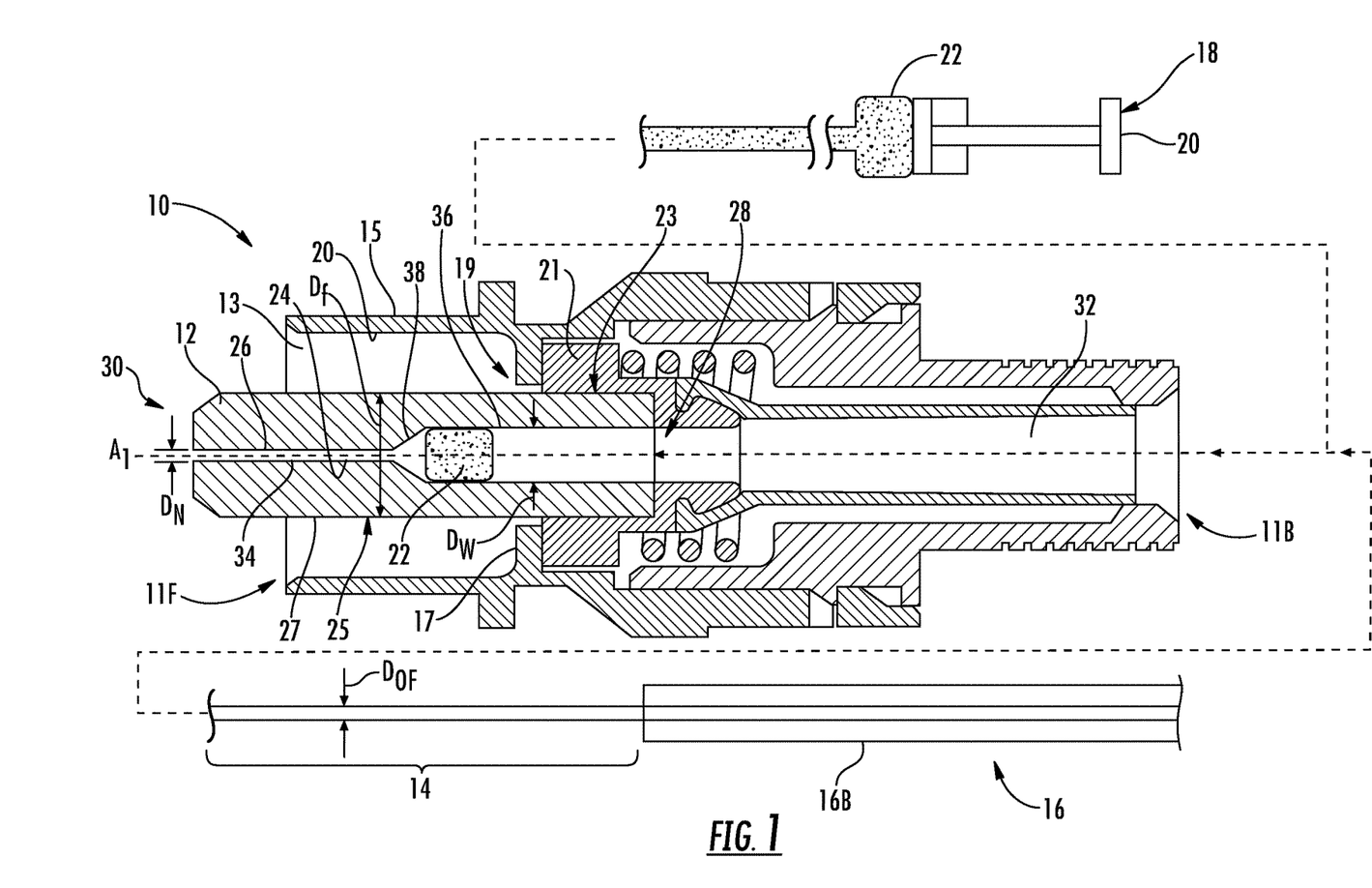
FIG. 1 is a cross-sectional view of an exemplary fiber optic connector, showing the optical fiber as an adjacent and unsecured part of the fiber optic connector.

FIG. 1 is a cross-sectional view of an exemplary fiber optic connector ("connector") 10 that has an open front end 11F, an open back end 11B and an optical axis $A_1$. The connector 10 includes a ferrule 12 disposed at front end 11F and an annular recess 13 around ferrule 12. The open front end 11F and annular recess 13 is defined by a connector housing 15, which in an example is made of plastic or like material. The connector housing 15 has an interior wall 17 with a central opening 19 through which ferrule 12 extends. The connector housing 15 also has an inner surface 20.

A ferrule holder 21 resides immediately adjacent interior wall 17 on the opposite side of open front end 11F and is configured to hold a rear-end portion 23 of ferrule 12. Ferrule 12 also has a front-end portion 25 and an outer surface 27.

The ferrule 12 is configured to be secured to an end portion 14 of an optical fiber 16, which is depicted in FIG. 1 as adjacent to and separate from the connector 10. The optical fiber 16 can include one or more coatings or protective layers 16B, such as one or more acrylic coatings and a buffer layer or buffer coating. The end portion 14 is a bare or stripped portion of the optical fiber, i.e., it does not include the one or more coatings or protective layers.

An exemplary insertion device 18, for example a syringe 20, can be disposed adjacent back end 11B of connector 10. The insertion device 18 contains a bonding agent 22 to be used to secure the optical fiber 16 to the ferrule 12. The bonding agent 22 may be provided (loaded) into the ferrule 12 by the ferrule manufacturer and stored therein for a significant period of time (e.g., at least a day, a week, a month, etc.) before putting together the connector 10. Alternatively, the bonding agent 22 may be loaded into an axial bore 26 ("ferrule bore 26") of the ferrule 12 at the time of putting together the connector 10.

The ferrule 12 includes an inner surface 24 forming the ferrule bore 26. The ferrule bore 26 extends axially through the ferrule 12 from a rear end 28 to a front end 30 of the ferrule 12. The ferrule bore 26 is used to precisely position the end portion 14 of the optical fiber 16 for establishing optical connections with other optical devices (not shown). The insertion device 18 may be inserted through an inner passageway 32 at the open back end 11B of connector 10 to dispose at least a portion of the bonding agent 22 within the ferrule bore 26, as shown in FIG. 1. In an example, the inner passageway 32 is sized to accommodate a buffer-coated portion of optical fiber 16.

In the example shown in FIG. 1, the ferrule bore 26 includes a narrow bore section 34 having a diameter $D_N$ at the front end 30 of the ferrule 12 and a wide bore section 36 having a diameter $D_W$, which is larger than $D_N$, at the rear end 28 of the ferrule 12. The end portion 14 of the optical fiber 16 may also be placed in the ferrule bore 26 before or with the bonding agent 22, which still remains unactivated (e.g., uncured) in such embodiments. In other embodiments, the ferrule bore 26 may not include a wide bore section and, therefore, have a diameter $D_N$ along the entire length or substantially entire length of the ferrule bore 26. In an example, the wide bore section 36 is sized to accommodate a buffer-coated portion of optical fiber 16.

Figure 2:
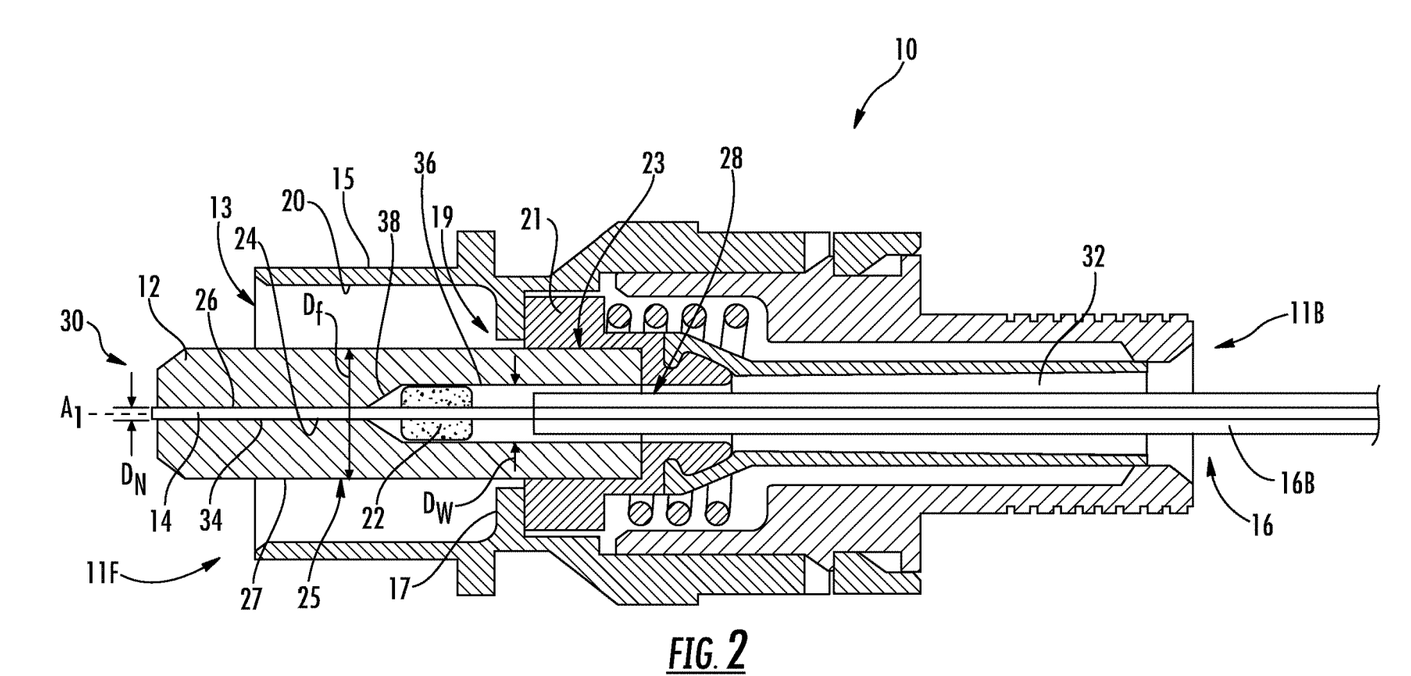
FIG. 2 is similar to FIG. 1 and shows the optical fiber operably inserted in the fiber optic connector.

Still referring to FIG. 1, the end portion 14 of the optical fiber 16 has a diameter $D_{OF}$ that is less than the diameter $D_N$ of the narrow bore section 34. The optical fiber 16 is inserted into the wide bore section 36 at the rear end 28 of the ferrule 12. As the optical fiber 16 is inserted into the ferrule 12, a funnel section 38 (or "transition section") of the ferrule bore 26 disposed between the wide bore section 36 and the narrow bore section 34 guides an end of the optical fiber 16 into the narrow bore section 34. FIG. 2 is similar to FIG. 1 and shows optical fiber 16 operably inserted into connector 10.

In one embodiment, the optical fiber diameter $D_{OF}$ of the end portion 14 of the optical fiber 16 is within one micron of the diameter $D_N$. In this manner, the inner surface 24 of the ferrule 12 may precisely hold the end portion 14 of the optical fiber 16 within the ferrule bore 26 and provide close proximity between the two objects, so that the end portion 14 of the optical fiber 16 and the inner surface 24 of the ferrule 12 may be more easily secured by the bonding agent 22.

Either at this point or at a point just prior to inserting optical fiber 16 into connector 10, the bonding agent 22 disposed within the ferrule bore 26 is heated to the securing temperature TS without applying excessive heat to other components of the connector 10, and in particular to connector housing 15.

Before describing systems and methods for heating the bonding agent 22 in further detail, it should be noted that the connector 10 shown and described is merely an example. Thus, although the connector 10 is shown in the form of an SC connector, the systems and methods may be used in connector with other connector designs. This includes LC, ST, and MPO-type connectors, for example, and other single-fiber or multi-fiber connector designs.

Heating Apparatus

Figure 3A:
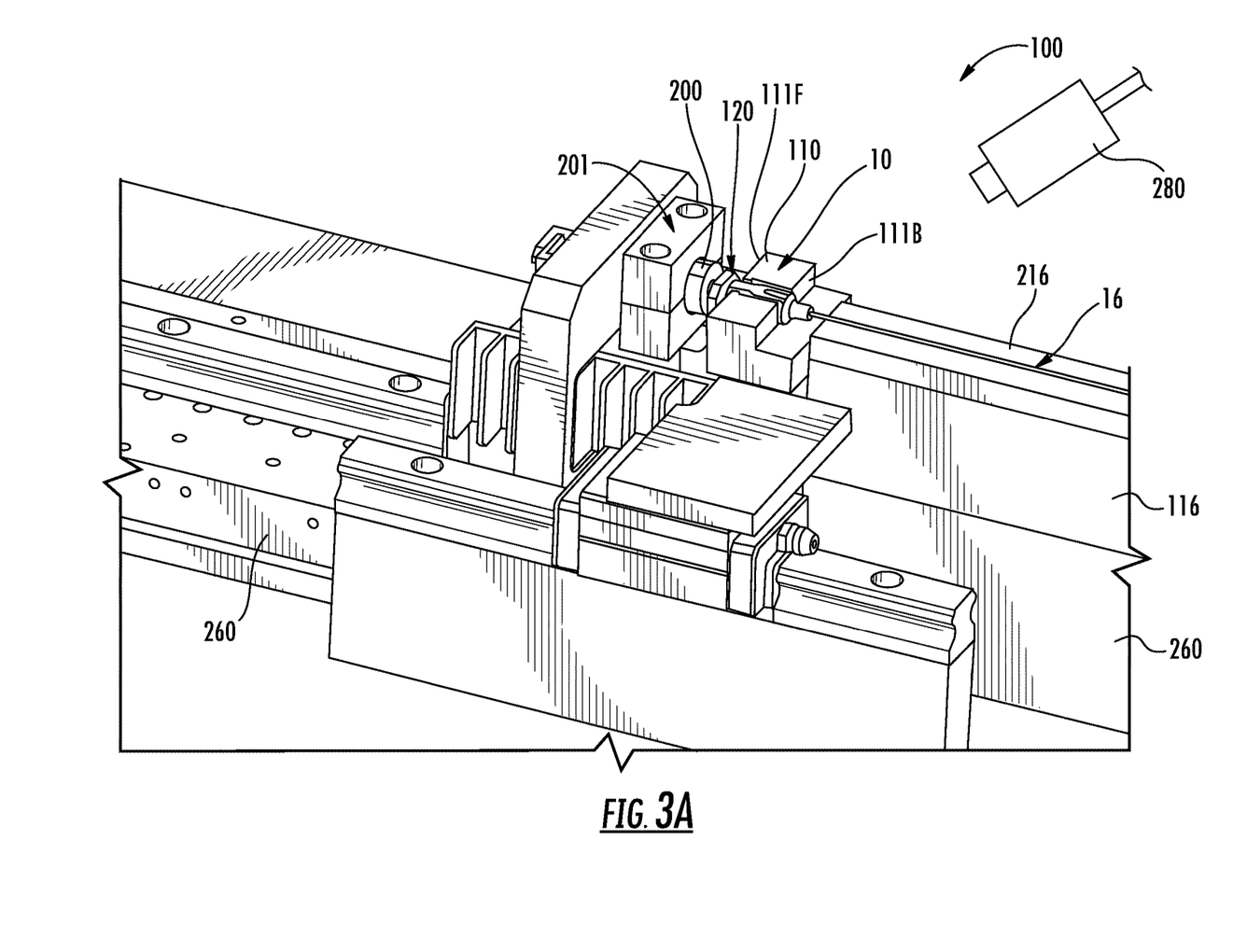
FIG. 3A is an elevated perspective view and FIG. 3B is a cross-sectional view of the fiber optic connector disposed in a heating apparatus configured to heat a bonding agent to secure an end portion of the optical fiber within a bore of the ferrule of the connector.
Figure 3B:
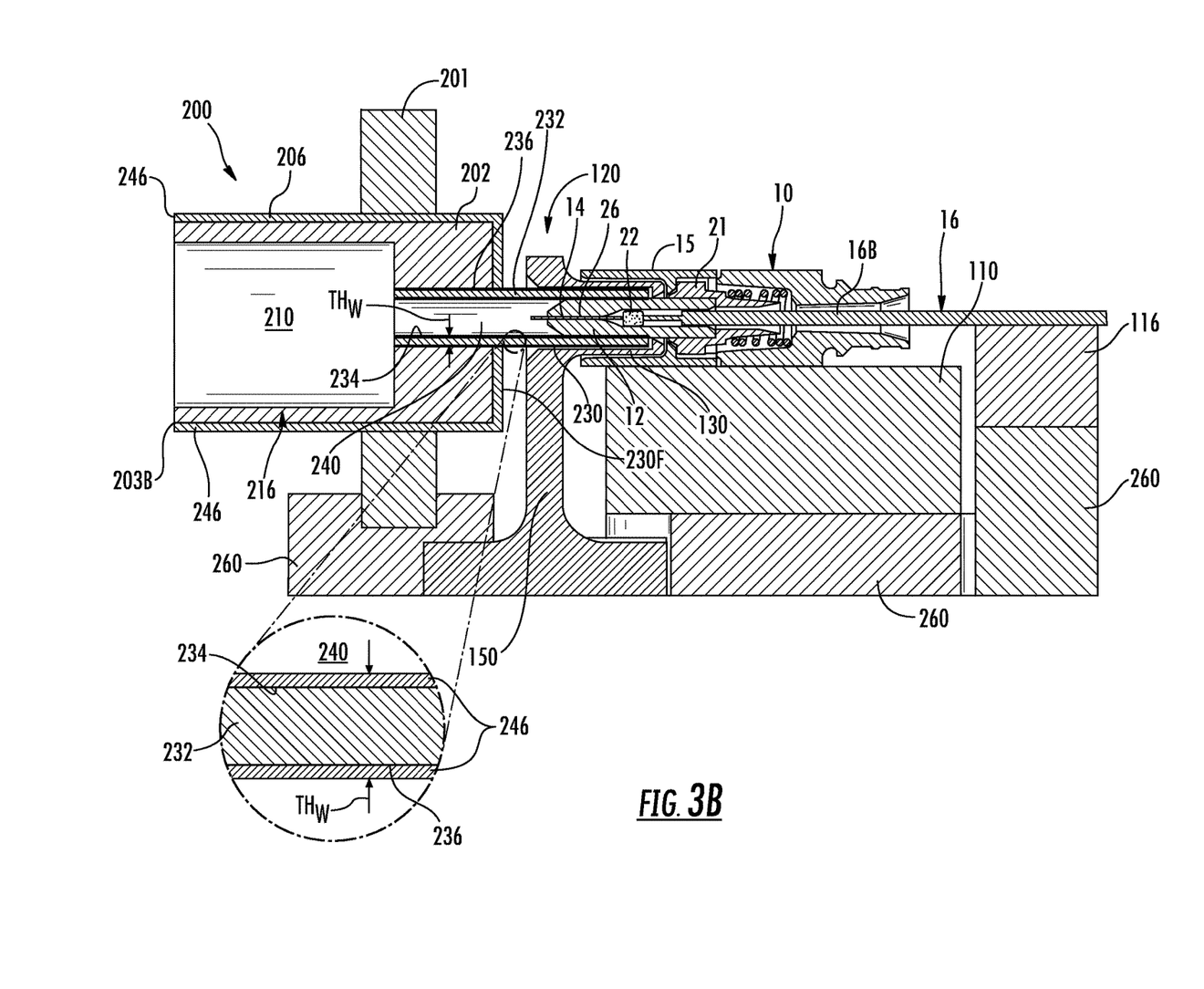

FIG. 3A is an elevated perspective view and FIG. 3B is a cross-sectional view of connector 10 disposed in a heating apparatus 100 configured to heat bonding agent 22 to secure end portion 14 of optical fiber 16 within ferrule bore 26. The heating apparatus 100 includes a connector holder 110 that that is configured to hold connector 10. The heating apparatus 100 further includes a fiber holder 116 disposed adjacent a back end 111B of the connector holder 110 and configured to hold optical fiber 16.

Figure 3C:
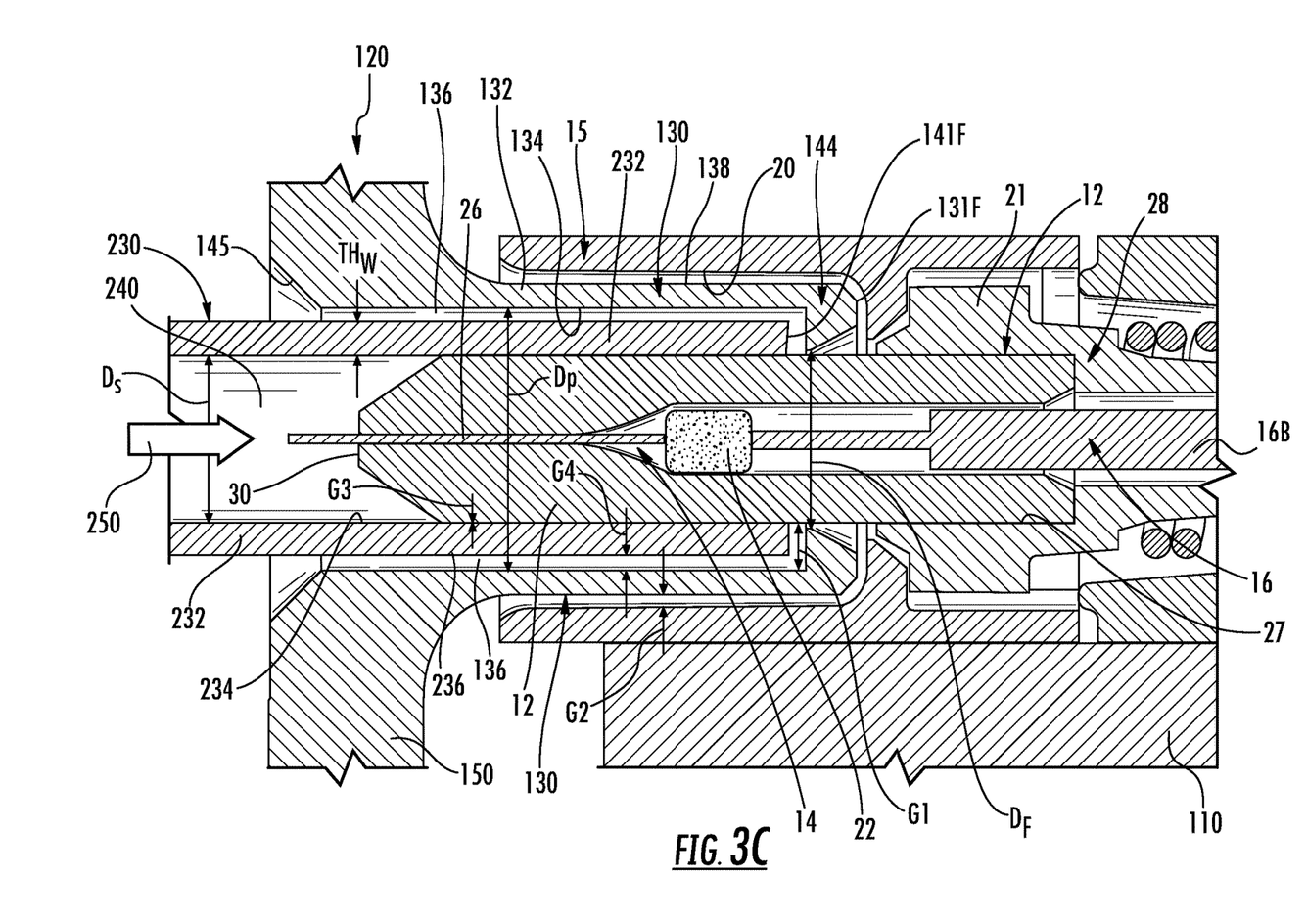
FIG. 3C is a close-up cross-sectional view of a front portion of the fiber optic connector as arranged in the heating apparatus of FIG. 3B.

The heating apparatus 100 in this particular embodiment also includes a thermal shield device 120 and a heating device 200 disposed adjacent a front end 111F of connector holder 110. FIG. 3C is a close-up cross-sectional view of the front end 11F of connector 10 as arranged in heating apparatus 100. The thermal shield device 120 includes a sleeve 130 having a front end 131F. The sleeve 130 is defined by a tubular wall 132 having an inner surface 134 that defines a cylindrical interior 136. The sleeve 130 also includes an outer surface 138. The sleeve 130 may include a first guide feature 144 shown by way of example in the form of a flange at the open front end 131F. The first guide feature 144 serves to guide sleeve 130 over ferrule 12. The sleeve 130 may additionally or alternatively include a second guide feature 145 shown by way of example as a flared opening at open back end 141B. The second guide feature 145 serves to guide a heating sleeve (an element different than sleeve 130), which is introduced and discussed below.

The cylindrical interior 136 of sleeve 130 has a diameter $D_P$ while the open front end 131F as defined by first guide feature 144 has a diameter $D_F$ that is slightly larger than the ferrule diameter $D_f$ (FIGS. 1 and 2).

In an example, sleeve 130 is supported by a base section 150. The sleeve 130 may be fabricated from a material having relatively low thermal conductivity such as stainless steel, ceramic, or glass. The sleeve 130 in such embodiments is thus thermally insulating and so is referred to hereinafter as "insulating sleeve 130" for ease of discussion.

The insulating sleeve 130 and the base section 150 can be formed from the same material and even be formed as a monolithic structure. Alternatively, the insulating sleeve 130 and the base section 150 can be different parts formed from different materials. In an example, thermal shield device can include a cooling feature (not shown), such as a passive heat sink, cooling channels, cooling fins, or the like.

Figure 4A:
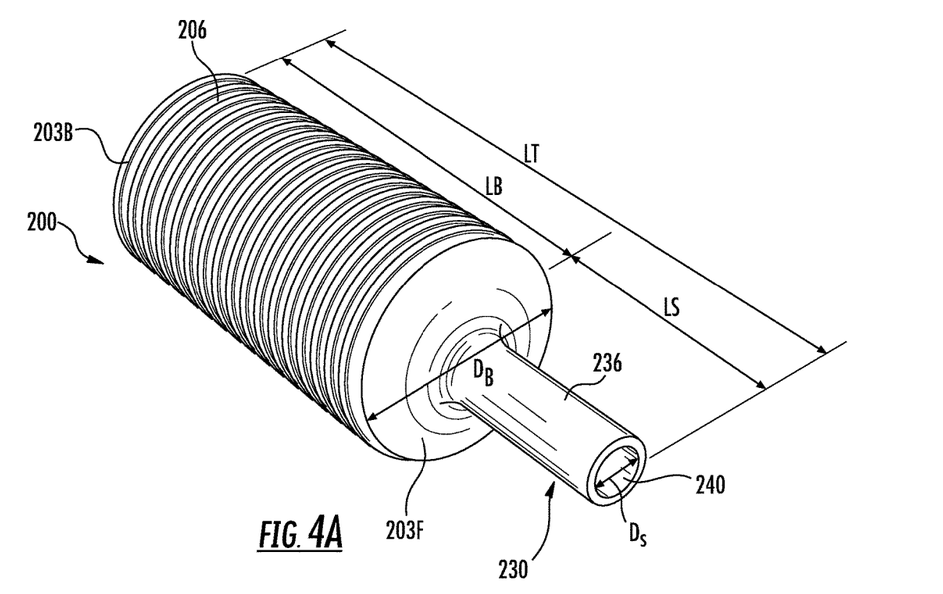
FIG. 4A is a perspective view of an example heating device that is part of the heating apparatus of FIGS. 3B and 3C.

The heating apparatus 100 includes a heating device 200, which is operably supported by a heating-device holder 201 (FIGS. 3A and 3B). The heating-device holder 201 may be movable. FIG. 4A is a perspective view of an example heating device 200. The example heating device 200 of FIG. 4A includes a main body section 202 that has a front end 203F, a back end 203B, and an outer surface 206. The heating device 200 also includes a sleeve 230 that is in thermal communication with the main body section, i.e., is configured to receive thermal energy from the main body section. For example, as shown, the sleeve 230 may be in physical contact with and extend from the front end 203F of the main body section 202. Indeed, main body section 202 and sleeve 230 may be monolithically formed from a single material having a relatively high thermal conductivity, such as copper. In this example or others (including those where main body section 202 and sleeve 230 are formed from different materials and/or from separate pieces joined together), main body section 202 can have a round, rectangular or polygonal cross-sectional shape.

Referring back to FIG. 3C, the sleeve 230 is defined by a tubular wall 232 that has an inner surface 234 and an outer surface 236 and a thickness $TH_W$. An example wall thickness $TH_W$ is 0.020 inches (0.508 mm). The inner surface 234 defines a cylindrical interior 240 having the same cross-sectional shape as ferrule 12 and having a diameter $D_S$ that, in an example, is only slightly larger than the ferrule diameter $D_f$ (FIGS. 1 and 2), e.g., by 0.001 inch (0.0254 mm).

As shown in FIG. 4A, the heating device 200 has an overall length LT, a main body section length LB, a main body dimension (e.g., diameter) $D_B$ and a sleeve length LS. In an example, the length LB is 1.25 inches (31.75 mm), the length LS is 0.25 inches (6.35 mm), the diameter DB is 0.625 inches (15.875 mm), and the diameter $D_S$ is about 0.1 inches (2.54 mm).

With reference again to FIG. 3B, the main body section 202 of heating device 200 operably supports at least one heating element 210. In an example, the heating element 210 resides within a cavity 216 formed within main body section 202. As a more specific example, the heating element 210 may be in the form of an electrically powered cartridge heater. The size and capabilities of the heating element 210 will vary depending on the exact embodiment. In a non-limiting example, heating element 210 has dimensions of about 0.5 inch (12.7 mm) in diameter and about 0.75 (19.05 mm) inches long. In this example or others, heating element 210 may be capable of generating about 200 W of heat. The heat from heating element 210 is conducted to sleeve 230 through main body section 202. This heat conduction path can provide a substantially uniform heat distribution through sleeve 230. Sleeve 230 is thus referred to as "heating sleeve 230" for ease of discussion and to further distinguish from insulating sleeve 130.

Figure 4B:
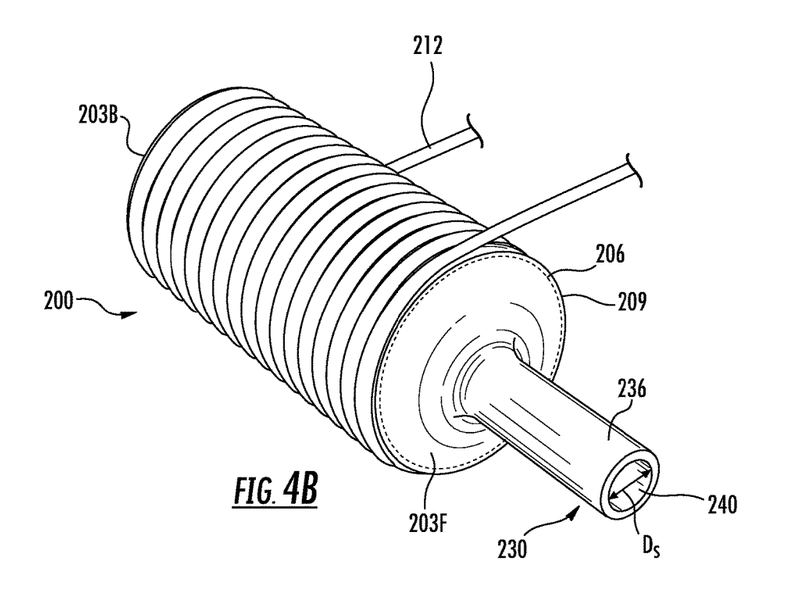
FIG. 4B is a perspective view similar to FIG. 4A and illustrates an example embodiment of a heating device having a heating element in the form of a heating coil.

FIG. 4B is similar to FIG. 4A and illustrates an example embodiment of heating device 200 wherein heating element 210 is in the form of a heating coil 212 that is wrapped around the outer surface 206 of main body section 202. In an example, heating coil 212 is defined by a resistance-heated wire, such as nichrome wire. The heating coil 212 may have a helical configuration to avoid overlap of the coil. In an example, a thin insulating layer 209 (FIG. 4B) can be provided on outer surface 206 of main body section 202 to electrically isolate main body section from the heating coil 212.

Other types of heating elements 210 can be used, such as an electrical arc device operably arranged with respect to main body section 202 to communicate the heat from the arc to the main body section, which as noted above then conducts the heat to the heating sleeve 230.

Referring again to FIG. 3B and the close-up inset shown therein, it may be advantageous to provide a coating 246 on at least the inner surface 234, wherein the coating has a hardness greater than the material making up the heating sleeve 230. In an example where the material making up the heating sleeve 230 is copper, the coating 246 can be in the form of nickel plating. The coating 246 can also be provided on the outer surface 236 of heating sleeve 230 as well as on the outer surface 206 of main body section 202 to prevent oxidation of the copper and to make the heating device dimensionally more stable. In an example, heating device 200 can be formed from a metal alloy, e.g., an alloy of copper. In another example, heating sleeve 230 can be made of silicon carbide or a like material that is interfaced with main body section 202 of a different material.

With reference again to FIG. 3A, the connector holder 110 and fiber holder 116 can be longitudinally translated, e.g., via the action of respective translation stages 260. The heating-device holder 201 can also be longitudinally translated, e.g., via the action of another translation stage 260, if desired. The translation stages 260 can include lateral motion control as well as longitudinal motion control. Additionally, a vision system 280 (e.g., a computer-controlled machine-vision system) can be used to assist in controlling the movement of the various components in heating apparatus 100.

In the operation of heating apparatus 100, the front end 131F of the insulating sleeve 130 of thermal shield device 120 is inserted into annular recess 13 at the open front end 11F of connector 10, as shown in FIGS. 3B and 3C, until the front end 131F makes contact with or resides immediately adjacent interior wall 17 of connector housing 15. During this insertion, the front-end portion 25 of ferrule 12 resides within interior 136 of insulating sleeve 130 of thermal shield device 120. The guide feature 144 at the open front end 131F of insulating sleeve 130 serves to guide the insulating sleeve over ferrule 12 so that the ferrules resides substantially at the center of interior 136 (i.e., substantially equidistance from interior wall 134). This creates an annular gap G1 defined by ferrule outer surface 27 and inner surface 134 of tubular wall 132 of insulating sleeve 130. In an example, gap G1 is about 0.03 inch (0.0762 mm). The outer surface 138 of insulating sleeve 130 and the inner surface 20 of connector housing 15 define an annular gap G2. In an example, annular gap G2 is about 0.01 inch (0.254 mm). In an example, guide feature 144 of insulating sleeve 130 helps prevent heating sleeve 230 from being inserted all the way to the interior wall 17 of connector housing 15. In a particular example, the flanged shape of first guide feature 144 of insulating sleeve 130 helps protect the interior wall 17 from both physical and thermal contact with heating sleeve 230.

Once the thermal shield 120 is operably arranged with respect to connector 10, then the heating sleeve 230 of heating device 200 is inserted into annular gap G1 so that the front-end section 25 of ferrule 12 closely resides within interior 240 of heating sleeve 230. In an example, the flared configuration of second guide feature 145 of thermal shield 120 facilitates this operation. In an example, the clearance between ferrule outer surface 27 and the inner surface 234 of heating sleeve 230 can define a relatively small gap G3, which in an example may be less than about 0.005 inches (0.127 mm). As a specific example, the gap G3 may be about 0.001 inch (0.0254 mm) in some embodiments. The close fit between heating sleeve 230 and ferrule 12 promotes the conduction of heat from the heating sleeve to the ferrule. The clearance between the outer surface 236 of heating sleeve 230 and the inner surface 134 of the insulating sleeve 130 of the thermal shield device 120 defines a gap G4 that in an example is 0.01 inch (0.254 mm) and thus substantially larger than gap G3. Thus, when the thermal shield device 120 and heating device 200 are operably arranged relative to connector 10, heating sleeve 230 of the heating device can loosely reside within insulating sleeve 130 of the thermal shield device.

In an example, the heating device 200 is activated (i.e., heated) prior to inserting heating sleeve 230 into annular gap G1. In other example, the heating device 200 can be activated once heating sleeve 230 is in place over front-end section 25 of ferrule 12.

Once the heating sleeve 230 is in place over ferrule 12 and has been activated, heat is conducted from the heating sleeve to the ferrule and to the bonding agent 22 residing within ferrule bore 26. The goal is to bring the bonding agent 22 to the securing temperature TS. The amount of time it takes to accomplish this goal (the "heating time") can be determined empirically or through thermal modeling. A temperature sensor (e.g., a fiber-based temperature sensor) can be inserted into the back end 11B of connector 10 to measure the temperature of ferrule 12 to assist in determining when the securing temperature TS is reached.

In an example, once ferrule 12 is engaged by the heating sleeve 230, the securing temperature TS is reached in a heating time of 10 seconds while in other examples the securing temperature is reached even faster (e.g., in 8 seconds, 5 seconds, 2 seconds), depending on the precise configuration and materials that make up the heating device 200 and connector 10, and in particular ferrule 12. Air may reside within the gap G3 between the heating sleeve 230 and ferrule 12, so that the heating time can depend in part on the thermal conductivity of air. If desired, a gas 250 having a thermal conductivity greater than air may be introduced in the gap G3 to increase the rate of heating (i.e., reduce the heating time) relative to that when air resides in the gap G3. An example gas 250 comprises helium, which has a thermal conductivity that is about 5× greater than that of air. In an example, gas 250 consists of helium. When gas 250 is used, gap G3 can be made larger, thereby relaxing the precision requirements of at least the heating sleeve 230. Relaxed precision requirements in turn allow for more tolerance for the presence of debris and for errors in the ferrule geometry (e.g., circularity).

Once the securing temperature TS for the bonding agent 22 is reached, the heating sleeve 230 and the thermal shield device 120 are withdrawn from connector 10, e.g., by the action of translation stages 260. At this point, if optical fiber 16 does not already reside in connector 10, the optical fiber is inserted into the connector 10 while the bonding agent 22 is at the securing temperature TS. In an example, the insertion of optical fiber 16 is accomplished by activating the translation stage 260 that supports the optical fiber. In an example, connector 10 can be actively cooled, e.g., by an air jet, to hasten the cooling of bonding agent 22. In another example, the optical fiber 16 is inserted into connector 10 prior to subjecting ferrule 12 to the above-described heating process (see FIG. 2).

Once the optical fiber 16 is secured within connector 10, the connector can be removed from heating apparatus 100.

Figure 5:
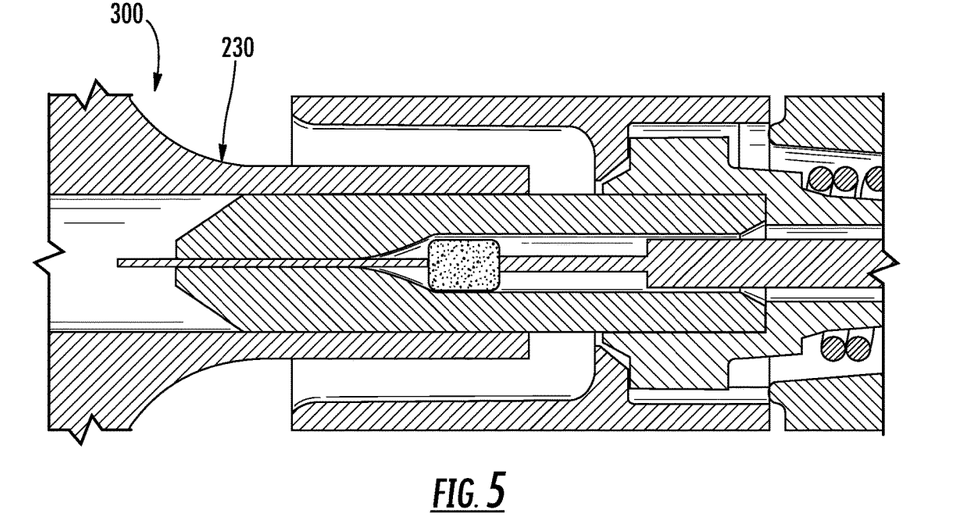
FIG. 5 is a cross-sectional view similar to FIG. 3C, but illustrates the front portion of the fiber optic connector in a heating apparatus according to another embodiment.
Figure 6:
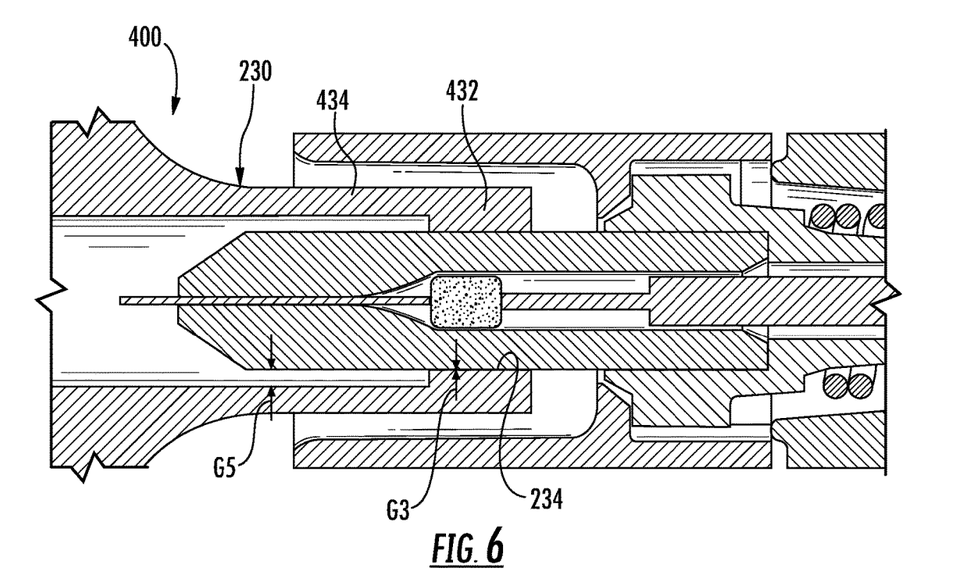
FIG. 6 is a cross-sectional view similar to FIG. 3C, but illustrates the front portion of the fiber optic connector in a heating apparatus according to yet another embodiment.
Figure 7:
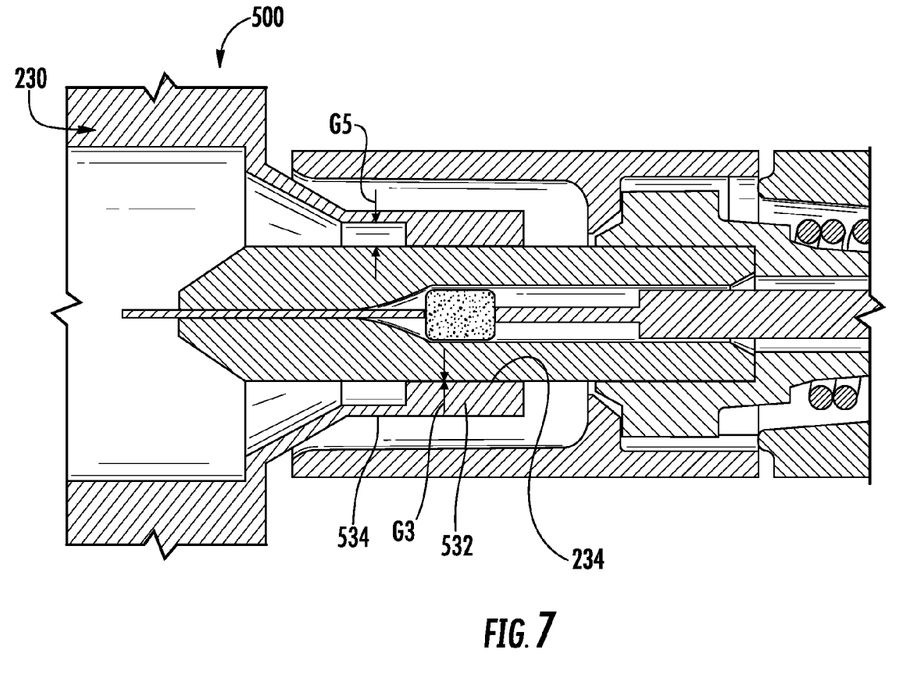
FIG. 7 is a cross-sectional view similar to FIG. 3C, but illustrates the front portion of the fiber optic connector in a heating apparatus according to yet another embodiment.

Although the embodiment shown in FIGS. 3A-3C includes the thermal shield device 120, in alternative embodiments the heating apparatus may not include any such device. FIGS. 5-7 illustrate examples of such alternative embodiments. Similar reference numbers are used to refer to elements corresponding to those discussed with reference to the embodiment shown in FIGS. 3A-3C. Accordingly, only the differences in these embodiments will be described.

In FIG. 5, a heating apparatus 300 is shown as having substantially the same configuration as the heating apparatus 100 (FIGS. 3A-3C), except that the thermal shield device 120 is not provided.

FIG. 6 illustrates a heating apparatus 400 still including the heating sleeve 230, but with the heating sleeve 230 having a different design than the embodiment shown in FIGS. 3A-3C. In FIG. 6, the heating sleeve 230 includes a tip portion 432 and an extension portion 434 extending over the outer surface 27 of the ferrule 12. The tip portion 432 includes the inner surface 234 such that the gap G3 is defined between the tip portion 432 and the outer ferrule outer surface 27. A gap G5 is also defined between the extension portion 434 and the ferrule outer surface 27, and the gap G5 is larger than the gap G3. Thus, the tip portion 432 is closer to the ferrule outer surface 27 than the extension portion 434. Such an arrangement may help keep portions of the ferrule 12 not including the bonding agent 22 at lower temperatures when applying heat to the ferrule 12.

In FIG. 7, a heating apparatus 500 includes a different configuration for the heating sleeve 230. The heating sleeve 230 still includes a tip portion 532 and extension portion 534 extending over the outer surface 27 of the ferrule 12 like the embodiment in FIG. 6. In FIG. 7, however, at least part of the extension portion 534 flares outwardly as the extension portion 534 extends rearwardly from the tip portion 532. In other words, at least part of the extension portion extends away from the ferrule outer surface 27 as the extension portion 534 extends rearwardly from the tip portion 532. Such an arrangement may further help keep portions of the ferrule 12 not including the bonding agent 22 at lower temperatures when applying heat to the ferrule 12.

It will be apparent to those skilled in the art that various modifications to the preferred embodiments of the disclosure as described herein can be made without departing from the spirit or scope of the disclosure as defined in the appended claims. For example, although the embodiments shown in the figures include the gap G3 between the heating sleeve 230 and ferrule outer surface 27, in some embodiments at least a portion of the heating sleeve 230 may contact the ferrule outer surface 27. Thus, the disclosure covers the modifications and variations provided they come within the scope of the appended claims and the equivalents thereto.

What is claimed is:

1. A method of securing an optical fiber within an optical fiber connector having a connector housing with an open front end and a ferrule with an outer surface, an axial bore, and a front-end section, the method comprising:
   a) positioning a heating sleeve so that the front-end section of the ferrule resides within an interior of the heating sleeve;
   b) conducting heat from the heating sleeve to the ferrule and to a bonding agent in the axial bore of the ferrule to bring the bonding agent to a securing temperature;
   c) inserting the optical fiber into the optical fiber connector so that a front-end section of the optical fiber resides within the axial bore of the ferrule; wherein the optical fiber is secured in the axial bore of the ferrule by the bonding agent when the bonding agent reaches the securing temperature; and
   d) inhibiting the conduction of heat from the heating sleeve to the connector housing by disposing a thermally insulating sleeve between the heating sleeve and the connector housing.

2. The method according to claim 1, wherein step c) is performed either before step b) or after disposing the thermally insulating sleeve between the heating sleeve and the connector housing.

3. The method according to claim 1, wherein the insulating sleeve includes a guide feature that guides the insulating sleeve over the front-end section of the ferrule.

4. The method according to claim 3, wherein the connector housing has an interior wall and wherein the guide feature inhibits physical contact and thermal contact between the interior wall and the heating sleeve.

5. The method according to claim 1, wherein a gap is maintained between an inner surface of the heating sleeve and the outer surface of the ferrule during steps b) and c).

6. The method according to claim 5, wherein the gap is less than 0.127 mm.

7. The method according to claim 5, wherein:
   the heating sleeve includes a tip portion and an extension portion extending over the outer surface of the ferrule;
   the tip portion includes the inner surface such that the gap is defined between the tip portion and the outer surface of the ferrule;
   a second gap is defined between the extension portion and the outer surface of the ferrule; and
   the second gap is larger than the gap between the tip portion and the outer surface of the ferrule.

8. The method according to claim 1, wherein:
   the heating sleeve includes a tip portion and an extension portion extending over the outer surface of the ferrule; and
   the tip portion is closer to the outer surface of the ferrule than the extension portion.

9. The method according to claim 1, wherein the heating sleeve does not contact the outer surface of the ferrule in steps b) and c).

10. The method according to claim 1, wherein the heating sleeve is part of a heating device that also includes a main body section in thermal communication with the heating sleeve, the method further comprising:
    heating the main body section with at least one heating element, wherein the heating sleeve becomes heated by heat communicated from the main body section.

11. A method of securing an optical fiber within an optical fiber connector having a connector housing with an open front end and a ferrule with an outer surface, an axial bore, and a front-end section, the method comprising:
    a) positioning a heating sleeve so that the front-end section of the ferrule resides within an interior of the heating sleeve;
    b) conducting heat from the heating sleeve to the ferrule and to a bonding agent in the axial bore of the ferrule to bring the bonding agent to a securing temperature;
    c) inserting the optical fiber into the optical fiber connector so that a front-end section of the optical fiber resides within the axial bore of the ferrule;
    wherein the optical fiber is secured in the axial bore of the ferrule by the bonding agent when the bonding agent reaches the securing temperature; and
    wherein the heating sleeve comprises a first material and includes an inner surface, and further comprising a coating comprising a second material on the inner surface, wherein the second material has a hardness greater than the first material.

12. A method of securing an optical fiber within an optical fiber connector having a connector housing with an open front end and a ferrule with an outer surface, an axial bore, and a front-end section, the method comprising:
    a) positioning a heating sleeve so that the front-end section of the ferrule resides within an interior of the heating sleeve;
    b) conducting heat from the heating sleeve to the ferrule and to a bonding agent in the axial bore of the ferrule to bring the bonding agent to a securing temperature;

c) inserting the optical fiber into the optical fiber connector so that a front-end section of the optical fiber resides within the axial bore of the ferrule;

wherein the optical fiber is secured in the axial bore of the ferrule by the bonding agent when the bonding agent reaches the securing temperature; and d) disposing an insulating sleeve over the front-end section of the ferrule to define an annular gap between the outer surface of the ferrule and the insulating sleeve, wherein the heating sleeve is inserted into the annular gap in step a), and wherein the insulating sleeve inhibits the conduction of heat from the heating sleeve to the connector housing in step c).

13. The method according to claim 12, wherein the insulating sleeve includes a guide feature that guides the insulating sleeve over the ferrule.

14. The method according to claim 13, wherein the connector housing has an interior wall and wherein the guide feature inhibits physical contact and thermal contact between the interior wall and the heating sleeve.

15. The method according to claim 1, further comprising:
introducing a gas into a gap between the heating sleeve and the front-end section of the ferrule, wherein the gas has a thermal conductivity that is greater than that of air.

* * * * *